United States Patent
Hedberg et al.

(10) Patent No.: US 12,462,471 B2
(45) Date of Patent: Nov. 4, 2025

(54) TOGGLING OPERATING MODES FOR GENERATING 3D REPRESENTATIONS

(71) Applicant: Apple Inc., Cupertino, CA (US)

(72) Inventors: Johan V. Hedberg, Foster City, CA (US); Corentin Cheron, Boulder, CO (US); Mukul Sati, San Jose, CA (US); Kyle L. Simek, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 337 days.

(21) Appl. No.: 18/093,364

(22) Filed: Jan. 5, 2023

(65) Prior Publication Data

US 2023/0215081 A1 Jul. 6, 2023

Related U.S. Application Data

(60) Provisional application No. 63/296,965, filed on Jan. 6, 2022.

(51) Int. Cl.
*G06T 15/20* (2011.01)

(52) U.S. Cl.
CPC .................. *G06T 15/20* (2013.01)

(58) Field of Classification Search
None
See application file for complete search history.

(56) References Cited

U.S. PATENT DOCUMENTS

| | | | |
|---|---|---|---|
| 9,195,306 B2 | 11/2015 | Gomez | |
| 11,580,703 B1 * | 2/2023 | Langguth | G06T 19/006 |
| 2007/0001836 A1 * | 1/2007 | Singer | G07C 5/085 340/528 |
| 2015/0123966 A1 | 5/2015 | Newman | |
| 2015/0286870 A1 | 10/2015 | Ellenby et al. | |
| 2016/0140733 A1 * | 5/2016 | Gu | H04N 13/172 348/43 |
| 2017/0214861 A1 * | 7/2017 | Rachlin | G03B 15/00 |
| 2018/0124317 A1 * | 5/2018 | Liu | H04N 25/51 |
| 2020/0334993 A1 * | 10/2020 | Demri | G08G 5/34 |
| 2021/0056750 A1 * | 2/2021 | Rowley | G06F 3/016 |
| 2021/0244502 A1 * | 8/2021 | Farkash | G06N 20/00 |
| 2022/0060622 A1 * | 2/2022 | Brändli | G06F 1/3231 |
| 2022/0066621 A1 * | 3/2022 | Appelbaum | H04L 65/80 |

* cited by examiner

*Primary Examiner* — Sultana M Zalalee
(74) *Attorney, Agent, or Firm* — Thompson Hine LLP

(57) ABSTRACT

Various implementations disclosed herein include devices, systems, and methods that adjusts operating modes for generating three-dimensional (3D) representations of a physical environment. For example, an example process may include acquiring sensor data by the one or more sensors in a physical environment and operating the device according to a first operating mode and a second operating mode during different periods of time. In the first operating mode (e.g., discovery mode), the device generates a 3D representation of the physical environment based on the sensor data and the device monitors one or more conditions to switch to the second operating mode. In the second operating mode (e.g., monitoring mode), the device monitors the one or more conditions to switch to the first operating mode and generates the 3D representation differently than the first operating mode.

20 Claims, 8 Drawing Sheets

TOGGLING OPERATING MODES FOR GENERATING 3D REPRESENTATIONS

CROSS-REFERENCE TO RELATED APPLICATIONS

This application claims the benefit of U.S. Provisional Application Ser. No. 63/296,965 filed Jan. 6, 2022, which is incorporated herein in its entirety.

TECHNICAL FIELD

The present disclosure generally relates to adjusting operating modes, and in particular, to systems, methods, and devices that adjusts operating modes for generating three-dimensional (3D) representations.

BACKGROUND

Various techniques are used to generate and present three-dimensional (3D) representations of a physical environment using an electronic device. However, scanning a scene of the physical environment for 3D reconstruction is computationally expensive. The scan is often performed at a high frequency so that the electronic device can recreate the scene accurately. Additionally, redundancies may occur when the device is scanning a previously-reconstructed area and maintaining the high frequency of scanning will result in additional wasted resources as subsequent processing is performed on the redundant scans.

SUMMARY

Various implementations disclosed herein include devices, systems, and methods that switch a three-dimensional (3D) reconstruction process mode (e.g., toggling operating modes) between a discovery mode and monitoring mode. Switching the 3D reconstruction process mode may be based on detecting whether there is something not yet reconstructed or something changed in the current view/sensor data and/or what the user is doing. Additionally, switching the 3D reconstruction process mode may be based on system constraints. For example, during a system override to avoid a system shutdown. The mode determination may be propagated to upstream resources (e.g., sensors and input algorithms such as a segmentation algorithm) and/or downstream resources (e.g., a plane detection algorithm) used to provide an extended reality (XR) environment.

In general, one innovative aspect of the subject matter described in this specification can be embodied in methods that include the actions of, at an electronic device having a processor and one or more sensors, acquiring sensor data by the one or more sensors in a physical environment, and operating the device according to a first operating mode and a second operating mode of a plurality of operating modes during different periods of time. In the first operating mode, the device generates a three-dimensional (3D) representation of the physical environment based on the sensor data and the device monitors one or more conditions to switch to the second operating mode. In the second operating mode, the device monitors the one or more conditions to switch to the first operating mode and generates the 3D representation differently than the first operating mode.

These and other embodiments can each optionally include one or more of the following features.

In some aspects, operating the device according to the first operating mode or the second operating mode is based on one or more parameters, wherein switching to the first operating mode or switching to the second operating mode is based on determining that the one or more parameters has changed or there is a new parameter.

In some aspects, determining that the one or more parameters has changed or there is a new parameter is based on tracking a viewpoint or a pose of an object, rendering a view of the 3D representation of the object from a current viewpoint/pose the object, and comparing current sensor data with the rendered view.

In some aspects, comparing current sensor data with the rendered view includes comparing depth images. In some aspects, comparing current sensor data with the rendered view includes determining a threshold amount of difference. In some aspects, comparing current sensor data with the rendered view is based on a distance threshold relative to the device.

In some aspects, the first operating mode uses more resources than the second operating mode. In some aspects, switching to the first operating mode or switching to the second operating mode is based on system constraints.

In some aspects, the first operating mode generates a 3D representation at a higher frequency than the second operating mode. In some aspects, the 3D representation is not updated or updated at a lower frequency in the second operating mode than in the first operating mode.

In some aspects, switching to the first operating mode or switching to the second operating mode changes one or more parameters that are propagated upstream. In some aspects, switching to the first operating mode or switching to the second operating mode changes one or more parameters that are propagated downstream.

In general, one innovative aspect of the subject matter described in this specification can be embodied in methods that include the actions of, at an electronic device having a processor, providing an extended reality (XR) environment using an XR process that includes sub-processes related to one another via one or more input-output dependencies, determining that a use of the device changes current input-output dependency requirements of the first sub-process of the sub-processes, and altering an operating mode of the first sub-process based on the changes to the current input-output dependency requirements of the first sub-process. Altering the operating mode reduces or increases the resources utilized by the first sub-process to satisfy the current input-output dependencies of the first sub-process.

These and other embodiments can each optionally include one or more of the following features.

In some aspects, the current input-output dependency requirements of the first sub-process is based on consumer driven resource usage requirements. In some aspects, the current input-output dependency requirements of the first sub-process is based on input driven resource usage requirements.

In some aspects, the first sub-process is a 3D reconstruction. In some aspects, the first sub-process is based on depth information. In some aspects, the first sub-process is based on attribute information. In some aspects, the first sub-process is based on depth estimation. In some aspects, the first sub-process is based on light estimation. In some aspects, the first sub-process produces a scene graph. In some aspects, the first sub-process produces acoustics based on spatial, material, or object type information.

In accordance with some implementations, a device includes one or more processors, a non-transitory memory, and one or more programs. The one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
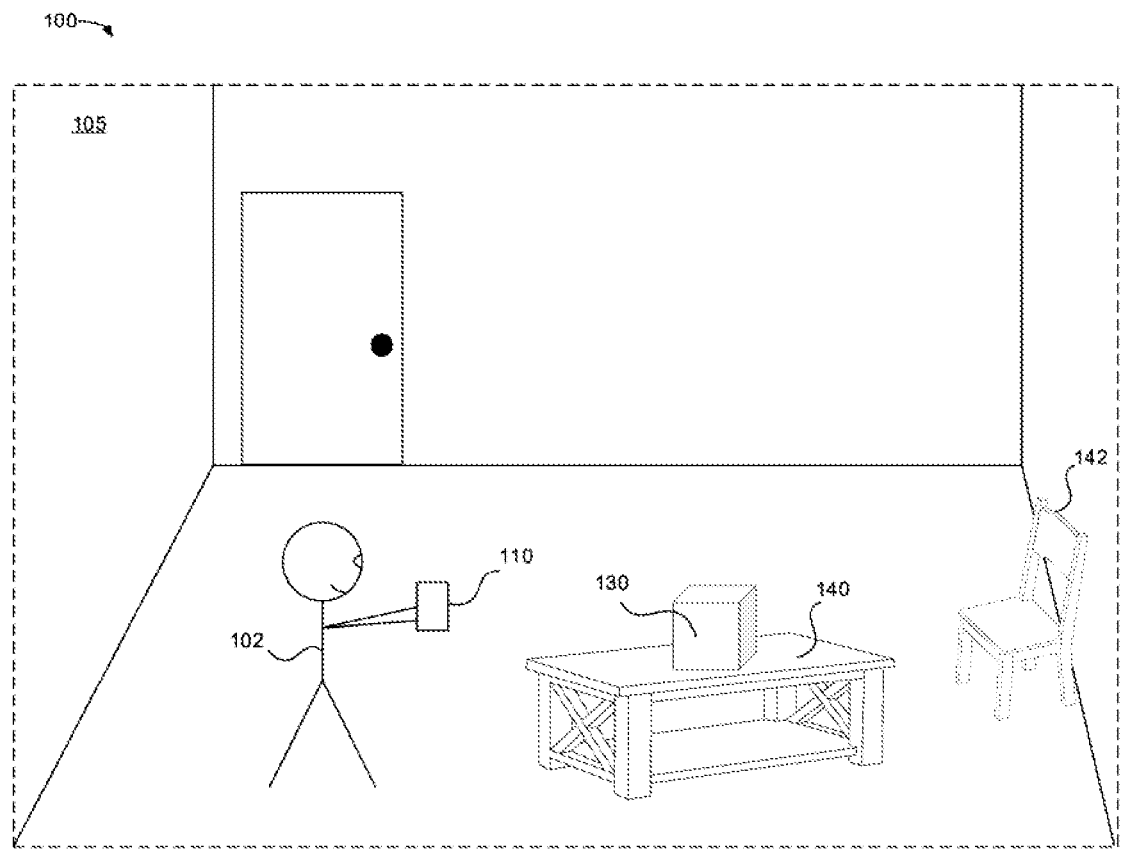
FIG. 1 is an example operating environment of a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 is a simplified diagram of an example operating environment 100 in accordance with some implementations. In this example, the example operating environment 100 illustrates an example physical environment 105 that includes an object 130, a table 140, and a chair 142. While pertinent features are shown, those of ordinary skill in the art will appreciate from the present disclosure that various other features have not been illustrated for the sake of brevity and so as not to obscure more pertinent aspects of the example implementations disclosed herein.

In some implementations, the device 110 is configured to present an environment to the user 102. In some implementations, the device 110 is a handheld electronic device (e.g., a smartphone or a tablet). In some implementations, the user 102 wears the device 110 on his/her head (e.g., a head-mounted device (HMD)). As such, the device 110 may include one or more displays provided to display content. The device 110 may enclose the field-of-view of the user 102.

In some implementations, the functionalities of device 110 are provided by more than one device. In some implementations, the device 110 communicates with a separate controller or server to manage and coordinate an experience for the user. Such a controller or server may be local or remote relative to the physical environment 105.

Figure 2:
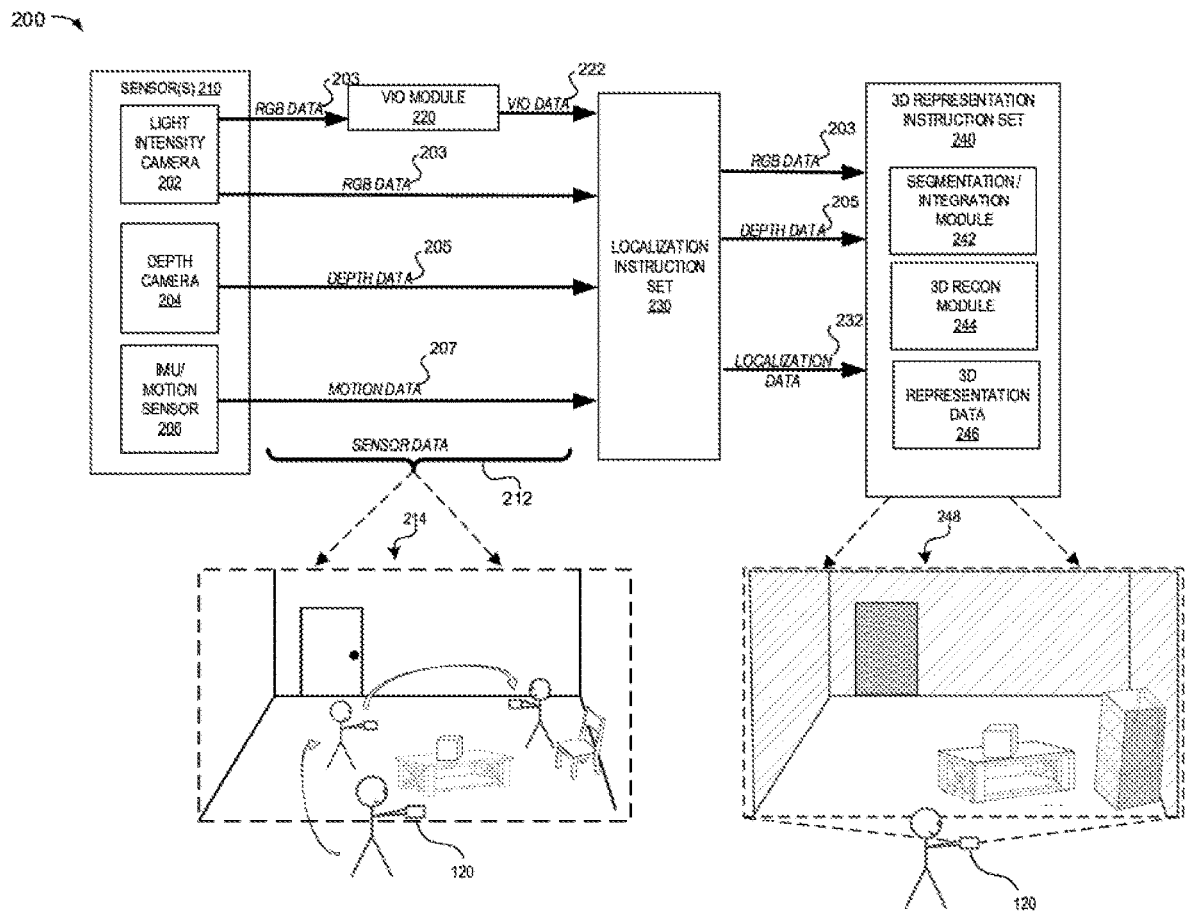
FIG. 2 is a system flow diagram of an example generation of three-dimensional (3D) representation data of the physical environment of FIG. 1 based on localization of a device that is based on depth data acquired by the device according to some implementations.

FIG. 2 is a system flow diagram of an of an example environment 200 for generating of three-dimensional (3D) representation data of a physical environment based on localization of a device that is based on depth data acquired by the device in accordance with some implementations. In some implementations, the system flow of the example environment 200 is performed on a device (e.g., device 110 of FIG. 1), such as a mobile device, desktop, laptop, or server device. In some implementations, the system flow of the example environment 200 is performed on processing logic, including hardware, firmware, software, or a combination thereof. In some implementations, the system flow of the example environment 200 is performed on a processor executing code stored in a non-transitory computer-readable medium (e.g., a memory).

The system flow of the example environment 200 acquires, utilizing a plurality of sensor(s) 210, light intensity image data 203 (e.g., live camera feed such as RGB from light intensity camera 202), depth image data 205 (e.g., depth image data such as RGB-D from depth camera 204), motion data 207 (e.g., motion trajectory data from motion sensor(s) 206) of a physical environment (e.g., the physical environment 105 of FIG. 1), acquires positioning information (e.g., VIO module 220 determines VIO data based on the light intensity image data 203), assesses the depth data 205 and motion data 207 to determine localization data 232 of the device (e.g., the localization instruction set 230), and generates 3D representation data 246 from the acquired sensor data (e.g., light intensity image data, depth data, and the like) and from the localization data 232 (e.g., the 3D representation instruction set 240). In some implementations, other sources of physical environment information can be acquired (e.g., camera positioning information such as position and orientation data from position sensors) as opposed to using a VIO system (e.g., VIO module 220).

In an example implementation, the environment 200 includes an image composition pipeline that acquires or obtains data (e.g., image data from image source(s), motion data, etc.) for the physical environment. Example environment 200 is an example of acquiring image sensor data (e.g., light intensity data, depth data, and motion data) for a plurality of image frames. For example, as illustrated in example environment 214, a user is walking around a room acquiring sensor data from sensor(s) 210. The image source(s) may include a light intensity camera 202 (e.g., RGB camera) that acquires light intensity image data 203 (e.g., a sequence of RGB image frames), a depth camera 204 that acquires depth data 205, and a motion sensor 206 that acquires motion data 207.

For positioning information, some implementations include a VIO system (e.g., VIO module 220) to determine equivalent odometry information (e.g., VIO data 222) using sequential camera images (e.g., light intensity image data 203) to estimate the distance traveled. Alternatively, some implementations of the present disclosure may include a simultaneous localization and mapping (SLAM) system (e.g., position sensors within the sensors 210). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 200 includes a plane detection/extraction instruction set that is configured with instructions executable by a processor to obtain sensor data (e.g., depth data 205 such as a sparse data map and motion data 207 such as motion trajectory data) and determines plane extraction information with respect to the physical environment using one or more of the techniques disclosed herein. For example, a horizontal plane (e.g., the seat of the chair 142) may be detected by a plane detection/extraction instruction set. The horizontal plane information may include plane-parameter information such as normal-to-the plane vectors, distance data, 3D coordinates of each detected point on the plane, and the like.

In an example implementation, the environment 200 further includes a localization instruction set 230 that is configured with instructions executable by a processor to obtain sensor data (e.g., RGB data 203, depth data 205, etc.) and track a location of a moving device (e.g., device 110) in a 3D coordinate system using one or more techniques. For example, the localization instruction set 230 analyzes RGB images from a light intensity camera 202 with a sparse depth map from a depth camera 204 (e.g., time-of-flight sensor), plane extraction data (e.g., plane estimation parameters), and other sources of physical environment information (e.g., camera positioning information such as VIO data 222 from the VIO module 220, or a camera's SLAM system, or the like) to generate localization data 232 by tracking device location information for 3D reconstruction (e.g., a 3D model representing the physical environment of FIG. 1).

In an example implementation, the environment 200 further includes a 3D representation instruction set 240 that is configured with instructions executable by a processor to obtain the sensor data (e.g., RGB data 203, depth data 205, etc.) and localization data 232 from the localization instruction set 230 and generate 3D representation data 246 using one or more techniques. For example, the 3D representation instruction set 240 analyzes RGB images from a light intensity camera 202 with a sparse depth map from a depth camera 204 (e.g., time-of-flight sensor, passive or active stereo sensors such as a structured light depth camera, and the like), and other sources of physical environment information (e.g., camera positioning information such as VIO data 222 from the VIO module 220, or a camera's SLAM system, or the like) to generate 3D representation data 246 (e.g., a 3D model representing the physical environment of FIG. 1).

The 3D representation data 246 could be 3D representations representing the surfaces in a 3D environment using a 3D point cloud with associated semantic labels. In some implementations, the 3D representation data 246 may be stored as a volumetric representation and/or an occupancy map. The 3D representations may be 3D bounding boxes for each detected object of interest, such as object 130, table 140, and chair 142. In some implementations, the 3D representation data 246 is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a Poisson meshing algorithm, a tetrahedral meshing algorithm, or the like) can be used to generate a mesh representing a room (e.g., physical environment 105) and/or object(s) within a room (e.g., object 130, table 140, chair 142, etc.). In some implementations, for 3D reconstructions using a mesh, a voxel hashing approach may be used in which 3D space is divided into voxel blocks, referenced by a hash table using their 3D positions as keys.

In some implementations, the 3D representation instruction set 240 includes an integration instruction set (e.g., integration/segmentation module 242) that is configured with instructions executable by a processor to obtain the subset of image data (e.g., light intensity data 203, depth data 205, etc.) and positioning information (e.g., camera pose information from the VIO module 220) and integrate (e.g., fuse) the subset of image data using one or more known techniques. For example, the image integration instruction set receives a subset of depth image data 205 (e.g., sparse depth data) and a subset of intensity image data 203 (e.g., RGB) from the image sources (e.g., light intensity camera 202 and depth camera 204), and integrates the subset of image data and generates 3D data. The 3D data can include a dense 3D point cloud (e.g., imperfect depth maps and camera poses for a plurality of image frames around the object) that is sent to the 3D representation instruction set 240. The 3D data can also be voxelized.

In some implementations, the 3D representation instruction set 240 includes a semantic segmentation instruction set (e.g., integration/segmentation module 242) that is configured with instructions executable by a processor to obtain a subset the light intensity image data (e.g., light intensity data 203) and identify and segment wall structures (wall, doors, windows, etc.) and objects (e.g., person, table, teapot, chair, vase, etc.) using one or more known techniques. For example, the segmentation instruction set receives a subset of intensity image data 203 from the image sources (e.g., light intensity camera 202), and generates segmentation data (e.g., semantic segmentation data such as RGB-S data). In some implementations, a segmentation instruction set uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

In an example implementation, the environment 200 may further include post processing or downstream processes that utilize the 3D representation data. The post processing may further refine the 3D representation data, or may use the data for different purposes/tasks (e.g., scene graphs, environment light estimation, body tracking, etc.). The post processing or downstream processing techniques are further described herein.

Figure 3:
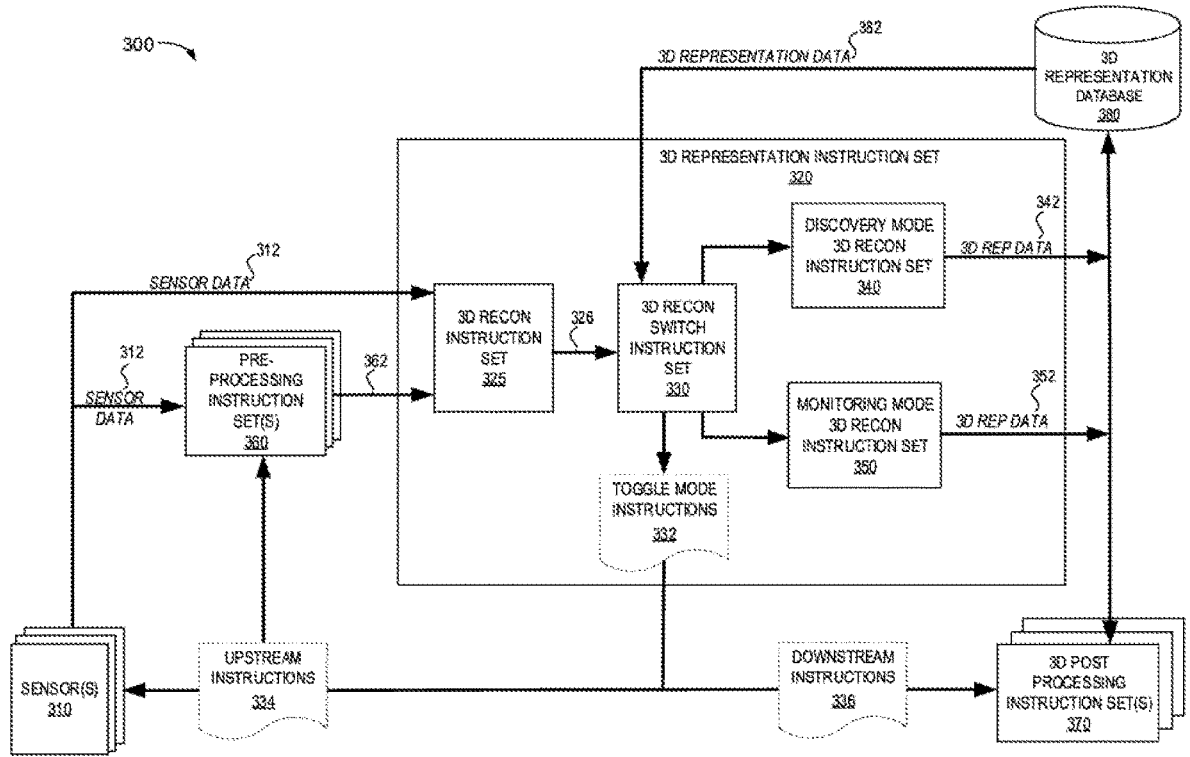
FIG. 3 is a system flow diagram of an example generation of 3D representation data of a physical environment based on a 3D reconstruction switch instruction set for operating between two or more operating modes according to some implementations.

FIG. 3 is a system flow diagram of an example environment 300 in which a system can generate 3D representation data of a physical environment based on a 3D reconstruction switch instruction set for operating between two or more operating modes according to some implementations. In some implementations, the system flow of the example environment 300 is performed on a device (e.g., device 110 of FIG. 1), such as a mobile device, HMD, desktop, laptop, or server device. In some implementations, the system flow of the example environment 300 is performed on processing logic, including hardware, firmware, software, or a combination thereof. In some implementations, the system flow of the example environment 300 is performed on a processor executing code stored in a non-transitory computer-readable medium (e.g., a memory).

The example environment 300 illustrates a system for switching between discovery and monitoring modes of a 3D reconstruction algorithm for optimal performance via the 3D reconstruction switch instruction set 330. In the discovery mode (e.g., via the discovery mode 3D reconstruction instruction set 340), the scanning is performed at a normal frequency, but when the 3D reconstruction switch instruction set 330 identifies that it is reconstructing an already reconstructed scene, the 3D reconstruction switch instruction set 330 can modify the frequency at which the scene is reconstructed (e.g., via the monitoring mode 3D reconstruction instruction set 350), and modify the frequency of related processes (e.g., via toggle mode instructions 332 to upstream and downstream processes) to save power without sacrificing 3D reconstruction performance. For instance, discovery mode 3D reconstruction instruction set 340 includes a 3D reconstruction algorithm that may run at 10 Hz, for example, in discovery mode, and modify the frequency to 1 Hz, for example, in monitoring mode upon a determination that the system is reconstructing an already reconstructed scene. The controlling of the upstream and downstream processes is further illustrated herein with reference to FIG. 4.

The system flow of the example environment 300 acquires sensor data 312 from sensors of a physical environment (e.g., the physical environment 105 of FIG. 1) and generates 3D representation data based on a discovery mode or monitoring mode, as determined by the 3D reconstruction switch instruction set 330. Additionally, the system flow assesses the 3D representation data, stores the 3D representation data in the 3D representation database 380, and determines and sends instructions for processing rates for upstream and downstream processes.

In an example implementation, the environment 300 includes an image composition pipeline that acquires or obtains data (e.g., sensor data 312 from sensor(s) 310) of the physical environment. Example environment 300 is an example of acquiring image sensor data (e.g., light intensity data, depth data, and position information) for a plurality of image frames, as discussed herein with reference to example environment 200 of FIG. 2. For example, as illustrated in example environment 214, a user is walking around a room acquiring sensor data from sensor(s) 210. The image source(s) may include a light intensity camera 202 (e.g., RGB camera) that acquires light intensity image data 203 (e.g., a sequence of RGB image frames), a depth camera 204 that acquires depth data 205, and a motion sensor 206 that acquires motion data 207.

In an example implementation, the environment 300 includes a 3D representation instruction set 320 that is configured with instructions executable by a processor to generate 3D representation data of a physical environment based on a 3D reconstruction switch instruction set for operating between two or more operating modes. The 3D representation instruction set 320 includes a 3D reconstruction instruction set 325, a 3D reconstruction switch instruction set 330, a discovery mode 3D reconstruction instruction set 340, and a monitoring mode 3D reconstruction instruction set 350. The 3D reconstruction instruction set 325 receives sensor data 312 from sensor(s) 310 and preprocessing data 362 from the preprocessing instruction set(s) 360 (e.g., depth processing information, segmentation data, etc.). The 3D reconstruction instruction set 325 then generates a first set of reconstruction data 326 of the physical environment based on the sensor data 312 and the preprocessing data 362. The 3D reconstruction instruction set 325 then sends reconstruction data 326 to the 3D reconstruction switch instruction set 330.

After receiving reconstruction data 326 (e.g., from an initial reconstruction), the 3D reconstruction switch instruction set 330 requests previously reconstructed 3D representation data 382 (if available) from the 3D reconstruction database 380 to determine an operating mode to continue to perform reconstruction. For example, if in a new environment, or in an environment that includes several areas that have not been reconstructed, the 3D reconstruction switch instruction set 330 initiates a discovery mode (e.g., normal power mode) via the discovery mode 3D reconstruction instruction set 340. The discovery mode 3D reconstruction instruction set 340 then generates 3D representation data 342 at a specific frequency. For example, a discovery mode reconstruction (e.g., if determined to be in an environment that has not been reconstructed) may generate a reconstruction at an operating frequency of 10 Hz.

In some implementations, if the 3D reconstruction switch instruction set 330 determines that the obtained reconstruction data 326 from the 3D reconstruction instruction set 325 is completed (or nearly completed) for the current view of the physical environment, then the 3D reconstruction switch instruction set 330 initiates a monitoring mode (e.g., low power mode) via the monitoring mode 3D reconstruction instruction set 350. The monitoring mode 3D reconstruction instruction set 350 then generates 3D representation data 352 at a lower specific frequency. For example, if it is determined to be in an environment that has already been reconstructed (e.g., via the received 3D representation data 382) a monitoring mode reconstruction may generate a reconstruction at a lower operating frequency, such as 1 Hz.

Alternatively, in some implementations, the system may initially obtain the 3D representation data from another source (e.g., stored in the 3D representation database 380), and either not perform 3D reconstruction or perform 3D reconstruction in a low power mode via the monitoring mode. For example, a user's living room may have already been scanned and reconstructed so the current system doesn't need to continually reconstruct the living room. Alternatively, if the user needs to move around to a different room, or if furniture is moved around within the room during viewing (e.g., an additional person comes into the physical room), then the 3D reconstruction switch instruction set 330 could switch to discovery mode, generate and update the 3D representation data in real-time.

In an example implementation, the environment 300 includes preprocessing instruction set(s) 360 and 3D post processing instruction set(s) 370. The 3D reconstruction switch instruction set 330, when toggling between the discovery mode and monitoring mode, may send toggle mode instructions 332 to different processes within the 3D reconstruction pipeline. For example, upstream instructions 334 may be sent to preprocessing instruction set(s) 360 and sensor(s) 310 to either slow the processing performance if switching from the discovery mode to the monitoring mode (e.g., 10 Hz to 1 Hz), or increase the processing performance if switching from the monitoring mode to the discovery mode (e.g., 1 Hz to 10 Hz). Similarly, downstream instructions 336 may be sent to 3D post processing instruction set(s) 370 to either slow the processing performance if switching from the discovery mode to the monitoring mode, or increase the processing performance if switching from the monitoring mode to the discovery mode. The controlling of the upstream and downstream processes is further illustrated herein with reference to FIGS. 4A and 4B.

Figure 4A:
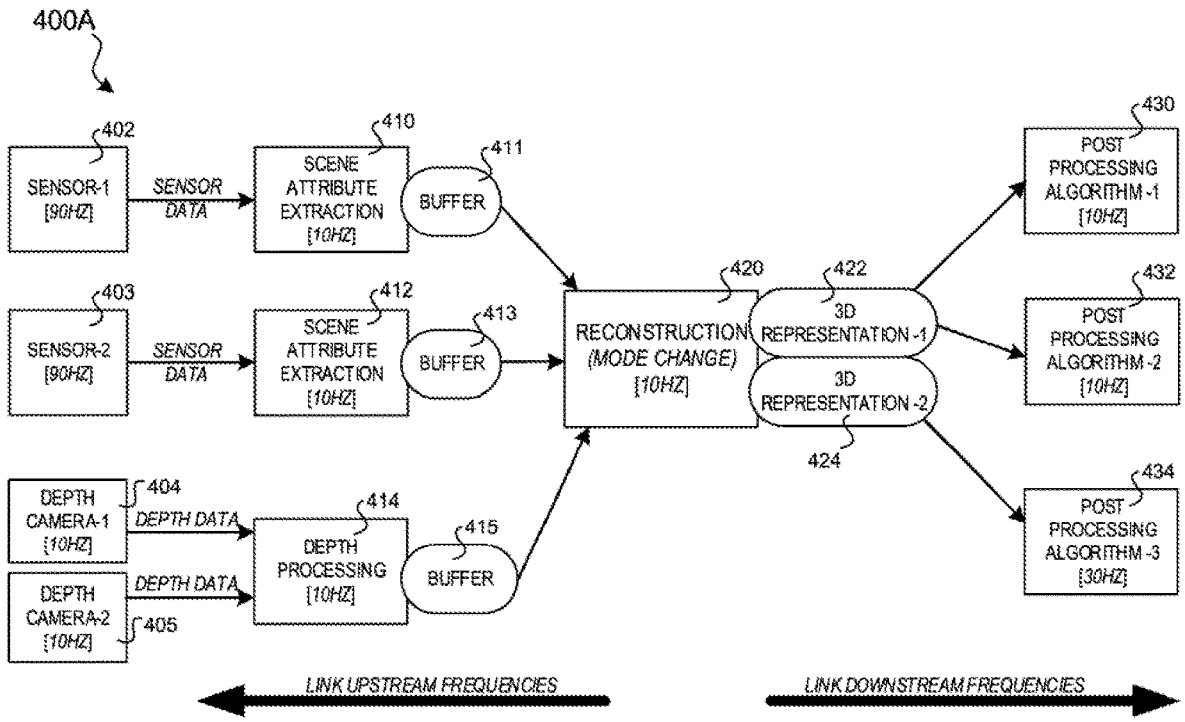
FIG. 4A illustrates an example 3D reconstruction process based on operating in a discovery reconstruction mode according to some implementations.

FIG. 4A illustrates an example environment 400A of a 3D reconstruction process based on operating in a discovery reconstruction mode according to some implementations. The system flow of the example environment 400 first acquires sensor data from sensors of a physical environment (e.g., the physical environment 105 of FIG. 1). For example, sensor data from sensor-1 402 and sensor-2 403 may be acquired which may include RGB data from a light intensity camera, depth data, ultrasonic data, smell data, etc. Additionally, depth data may be acquired from depth camera-1 404 and depth camera-2 405. Then preprocessing algorithms utilize the sensor data to process for 3D reconstruction. For example, the scene attribute extraction module 410 and scene attribute extraction module 412 acquires sensor data and performs segmentation processes and sends the segmentation data to the reconstruction (mode change) module 420 via buffer 411 and buffer 413, respectively. Additionally, the depth processing module 414, acquires the depth data, and sends the determined depth resource data via buffer 415 to the reconstruction (mode change) module 420 to generate the 3D reconstruction data. The reconstruction (mode change) module 420 then generates a variety of 3D representations, such as 3D representation-1 422 (e.g., mesh data), and 3D representation-2 424 (e.g., planes data). The 3D reconstruction data is then sent to the post processing modules. For example, the 3D representation-1 422 (e.g., mesh data) may be sent to post processing algorithm-1 module 430 and post processing algorithm-2 module 432, and the planes data may be sent to the post processing algorithm-3 module 434. In an exemplary implementation, the reconstruction (mode change) module 420 may include the 3D representation instruction set 320, which may include the 3D reconstruction switch instruction set 330, the discovery mode 3D reconstruction instruction set 340, and the monitoring mode 3D reconstruction instruction set 350, as discussed herein with reference to FIG. 3.

The reconstruction (mode change) module 420 may request resources from upstream modules (e.g., modules to the left of reconstruction (mode change) module 420) at 10 Hz so that the reconstruction (mode change) module 420 can generate 3D representations of the environment at 10 Hz. Downstream processes (e.g., modules to the right of reconstruction (mode change) module 420) are also operating at 10 Hz during the discovery mode to further process the 3D representation data. For example, operating at a higher frequency (e.g., 10 Hz) may be utilized to achieve a reconstruction frequency suitable for real-time scene understanding during operation. However, when the reconstruction (mode change) module 420 determines that it has reconstructed a scene that was already previously reconstructed, the reconstruction (mode change) module 420 (e.g., via the 3D reconstruction switch instruction set 330) may switch into monitoring mode where it decreases the frequency (1 Hz) at which it reconstructs the scene. The reconstruction (mode change) module 420 can propagate a decrease for the request frequency as well as the operating frequency of downstream processes. This will save power without sacrificing reconstruction accuracy. The lower power mode (e.g., the monitoring mode) is further discussed with reference to FIG. 4B.

Figure 4B:
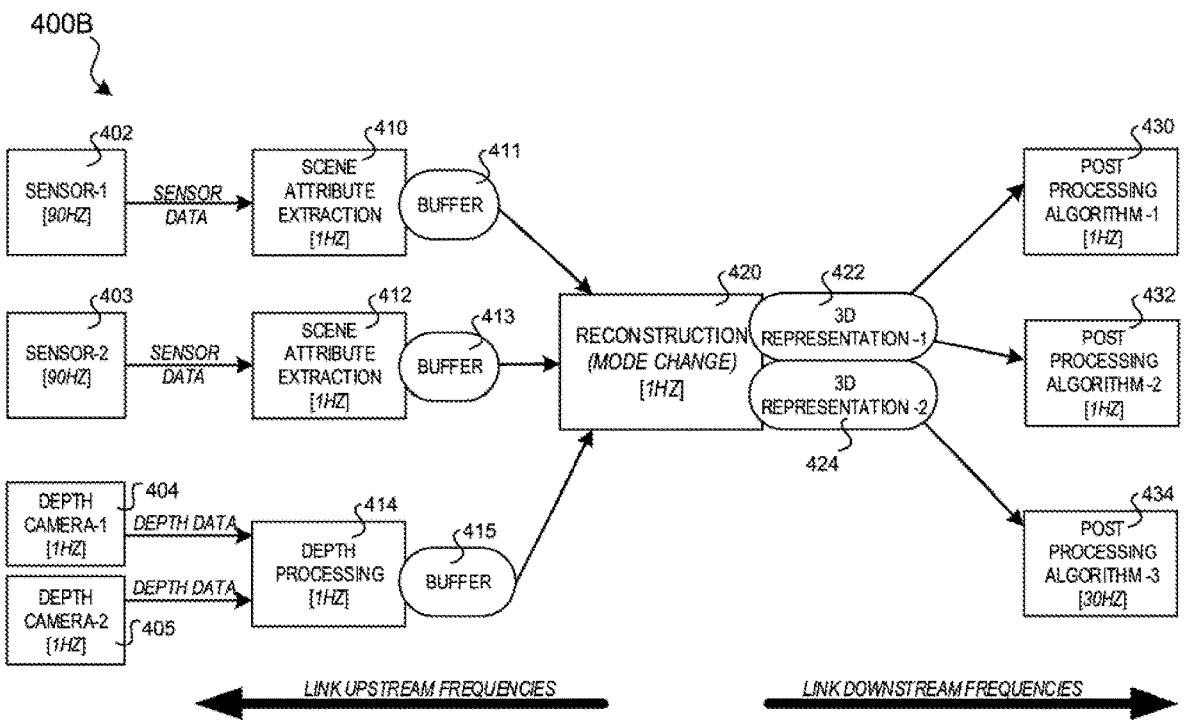
FIG. 4B illustrates an example 3D reconstruction process based on operating in a monitoring reconstruction mode according to some implementations.

FIG. 4B illustrates an example environment 400B of a 3D reconstruction process based on operating in a monitoring reconstruction mode according to some implementations. Environment 400B includes the same components and processes as described herein with reference to environment 400A of FIG. 4A, however, the processing power for environment 400B has been throttled to a lower power state (e.g., 10 Hz to 1 Hz as illustrated) for several of the upstream and downstream modules. For example, the 3D reconstruction switch instruction set 330, based on the received data such as previous reconstructed data (e.g., 3D representation data 382 from the 3D representation database 380) determined to reconstruct the scene in a lower power mode via the monitoring mode 3D reconstruction set 350.

In some implementations, in a monitoring mode (e.g., a lower power mode) the system can reduce the inputs that are required and stop running some other algorithms and/or stop cameras or reduce frame rate. The reduction or stoppage of processing may be propagated throughout the system (upstream and downstream). For example, post processing algorithms may use the 3D information of the environment to run a detection of environment lighting that that depends on one of the 3D representations generated by the reconstruction (mode change) module 420. Propagating the lower power mode throughout the 3D reconstruction process can provide power saving and optimization to use less computations because the physical environment may not change most of the time during a scan of a previously reconstructed room (e.g., the user's living room where they typically engage with an HMD).

In some implementations, location data may be obtained from the device in order to determine to limit generating a current 3D mesh within a particular radius from the device (e.g., 5 meters) and render (e.g., generate 3D representation data) from a current viewpoint to obtain a depth map. The depth map can then be compared with current sensor data (network input raw sensor data—e.g., dense depth map). If the comparison results in a difference that is greater than a particular threshold, then it may be determined that something has changed in the physical environment (e.g., a new object) or that the current reconstruction information may need to be updated (e.g., the size of a chair was not accurate).

In some implementations, the monitoring mode may obtain single frames (e.g., depth and RGB data) and fuse them into a sparse grid that are kept across frames. Then if the user's view is looking at a particular region for some period of time (e.g., 3 seconds or more), and if you consistently detect a difference for that period of time, than it can be determined there is a change in the environment, and not just noise, and thus the 3D reconstruction switch instruction set 330 can determine to switch to the discovery mode (e.g., via discovery mode 3D reconstruction set 340). Masking data may also be utilized during the monitoring mode to ensure that if a new object (e.g., a pet or another person) that walks into the view doesn't trigger the discovery mode. These types of masking algorithms (e.g., occlusion algorithms) are examples of preprocessing information that may be obtained during the reconstruction process. For example, as illustrated in FIG. 3, the preprocessing instruction set 360 provides preprocessing data 362 (e.g., masking data, segmentation data, etc.) to the reconstruction process of the 3D representation instruction set 320.

Figure 5:
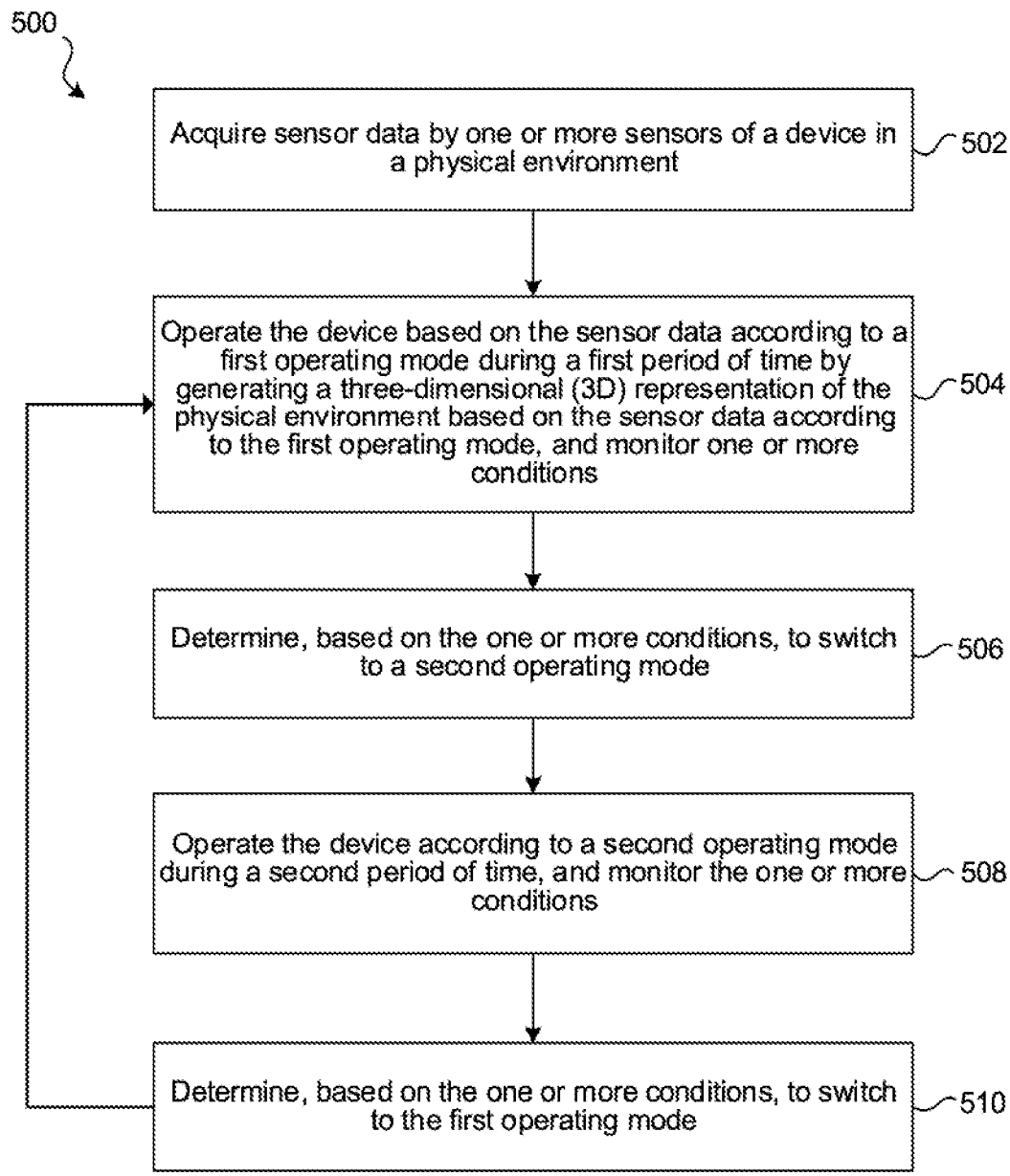
FIG. 5 is a flowchart representation of an exemplary method that operates between two or more operating modes for generating 3D representation data based on sensor data and monitoring one or more conditions in accordance with some implementations.

FIG. 5 is a flowchart representation of an exemplary method 500 that operates between two or more operating modes for generating 3D representation data based on sensor data and monitoring one or more conditions in accordance with some implementations. In some implementations, the method 500 is performed by a device (e.g., device 110 of FIG. 1), such as a mobile device, HMD, desktop, laptop, or server device. In some implementations, the method 500 is performed by processing logic, including hardware, firmware, software, or a combination thereof. In some implementations, the method 500 is performed by a processor executing one or more instruction sets stored in a non-transitory computer-readable medium (e.g., a memory).

At block 502, the method 500 acquires sensor data by one or more sensors of a device in a physical environment. The sensor data may include light intensity image data (e.g., a sequence of RGB image frames). The sensor data may further include depth data (e.g., reflectivity data) acquired from a depth sensor (e.g., depth sensor data from a LIDAR sensor, time-of-flight sensor, an IR-based depth sensor, or the like). For example, a user may use sensor(s) on a device (e.g., cameras) to acquire image data of a physical environment (e.g., physical environment 105 of FIG. 1).

At block 504, the method 500 operates the device based on the sensor data according to a first operating mode during a first period of time by generating a 3D representation of the physical environment based on the sensor data according to the first operating mode, and monitors one or more conditions. For example, a 3D reconstruction of the physical environment may be generated based on the sensor data. The 3D representation may be a 3D model (e.g., a 3D mesh representation, a 3D point cloud with associated semantic labels, or the like). In some implementations, generating a 3D representation may include a computer-vision depth analysis.

In some implementations, the first operating mode may be a discovery mode for 3D reconstruction as discussed herein (e.g., discovery mode 3D reconstruction instruction set 340 of FIG. 3). For example, generating a 3D representation of the physical environment at a higher computational level (e.g., 10 Hz) because the scene is new or unknown to the device (e.g., no previous 3D representation data was discovered for a particular area during a scan for a period of time).

In some implementations, the period of time may be an explicit user scan (e.g., directed by user input while scanning such as an on/off operation) or a user participating in an XR activity during which a background scan occurs (e.g., a floor mapping application).

At block 506, the method 500 determines to switch to a second operating mode based on the one or more conditions, and at block 508, the method 500 operates the device according to a second operating mode during a second period of time and monitors the one or more conditions. In some implementations, the second operating mode may be a monitoring mode (e.g., lower power mode) for 3D reconstruction as discussed herein (e.g., monitoring mode 3D reconstruction instruction set 350 of FIG. 3). For example, generating a 3D representation of the physical environment at a lower computational level (e.g., 1 Hz) because the scene is determined to have been reconstructed before by the device (e.g., previous 3D representation data was discovered for a particular area during a scan for a period of time and stored in the 3D representation database 380). Alternatively, the second operating mode may be scanning the environment, but not generating a 3D representation. For example, instead of regenerating or updating the same area for the 3D representation (e.g., at a low rate), the second operating mode may only include a scanning feature, and no 3D representation data is generated during the scan until one or more conditions are met and the process switches back to the discovery mode.

At block 510, the method 500 determines to switch to the first operating mode based on the one or more conditions, and then returns to block 504, where the method 500 operates the device according to the first operating mode and monitors one or more conditions. For example, during a 3D mesh reconstruction algorithm protocol, the system will automatically switch back and forth between the first operating mode and the second operating mode based on one or more conditions. For example, if a user is scanning a room, the system will increase the 3D reconstruction processing (e.g., discovery mode) when it is determined to be a new area in the physical environment, something changed in the current view/sensor data, or other conditions (e.g., user movement/input, or system constraints, i.e., during a system override to avoid a shutdown).

In some implementations, the first operating mode uses more resources (e.g., computation, power, other algorithms, etc.) than the second operating mode. In some implementations, the first operating mode generates a 3D representation at a higher frequency than the second operating mode. For example, the 3D reconstruction generation may occur at a frequency of 10 Hz in the first operation mode (e.g., discovery mode) compared to generating a 3D reconstruction at a frequency of 1 Hz in the second operation mode (e.g., monitoring mode). In some implementations, the 3D representation is not updated or updated at a lower frequency in the second operating mode than in the first operating mode (e.g., 10 Hz in a discovery mode versus 1 Hz in a monitoring mode).

In some implementations, operating the device according to the first operating mode or the second operating mode is based on one or more parameters, wherein switching to the first operating mode or switching to the second operating mode is based on determining that the one or more parameters has changed or there is a new parameter.

In some implementations, determining that the one or more parameters has changed or there is a new parameter is based on tracking a viewpoint or a pose of an object, rendering a view of the 3D representation of the object from a current viewpoint/pose the object, and comparing current sensor data with the rendered view. In some implementations, comparing current sensor data with the rendered view includes comparing depth images.

In some implementations, comparing current sensor data with the rendered view includes determining a threshold amount of difference. For example, mask data may be used to remove a pet walking by, thus creating some discrepancy between the 3D representation and the current sensor data during a scan. The threshold may be set, for example, at a 10% difference, and if the discrepancy is determined to be higher than the set threshold of 10%, than the operating mode may be switched to a discovery mode to update the 3D representation.

In some implementations, comparing current sensor data with the rendered view is based on a distance threshold relative to the device. For example, comparing data within a five meter range from the device.

In some implementations, switching to the first operating mode or switching to the second operating mode is based on determining a scene understanding. For example, determine what a user is doing during the scan based on an analysis of the user and/or the physical environment. In some implementations, switching to the first operating mode or switching to the second operating mode is based on system constraints. For example, during a system override, the operating modes may be switched to avoid a shutdown.

In some implementations, switching to the first operating mode or switching to the second operating mode changes one or more parameters that are propagated upstream. For example, decrease or increase the request frequency from algorithms that are inputs to the reconstruction algorithm such as the scene/scene attribute extraction, and depth processing algorithms.

In some implementations, switching to the first operating mode or switching to the second operating mode changes one or more parameters that are propagated downstream. For example, decrease or increase the operating frequency to the algorithms that are outputs from the reconstruction algorithm such as an environment light estimation and/or scene graph algorithms.

In some implementations, the 3D representation is a computer-generated reality (CGR) environment that is presented to the user. In one example, the entire experience of watching a virtual screen is within a fully immersive CGR environment while wearing an HMD. In some implementations, the graphical environment is a mixed reality (MR) experience that is presented to the user. For example, the screen is virtual and the corresponding illumination from the virtual screen is virtual, but the remaining environment is the physical environment, either from video-see-through (e.g., in which the physical environment is captured by a camera and displayed on a display with additional content) or optical-see-through (e.g., in which the physical environment is viewed directly or through glass and supplemented with displayed additional content).

Figure 6:
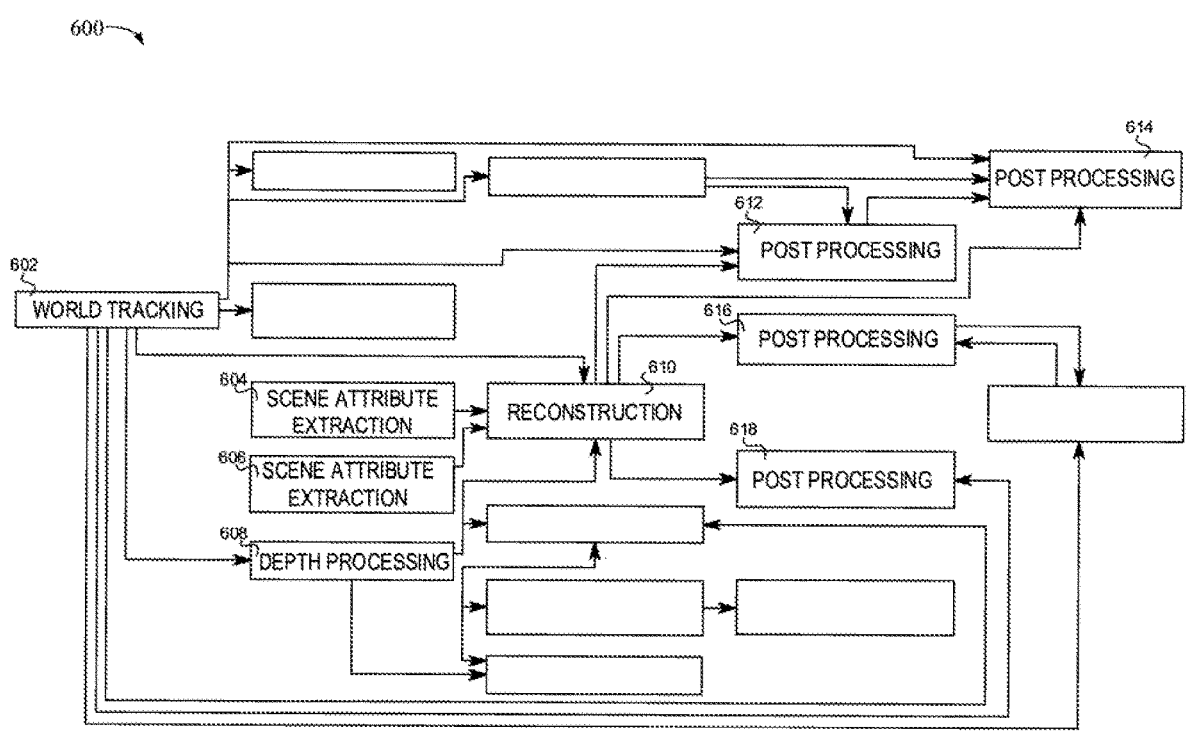
FIG. 6 illustrates a graph of input-output dependencies for an exemplary method for generating and refining a 3D mesh reconstruction in accordance with some implementations.

FIG. 6 illustrates a graph 600 of input-output dependencies for an exemplary method for generating and refining a 3D mesh reconstruction in accordance with some implementations. In an exemplary embodiment, the mesh reconstruction module 610 may receive data from several input sub-processes. For example, a world tracking module 602 may provide tracking information in the physical environment to the mesh reconstruction module 610. A scene attribute extraction module 604 may provide information related to the physical properties of each object to the mesh reconstruction module 610. The scene attribute extraction module 606 may provide segmentation data (e.g., semantic data such as data points labeled as a chair, table, floor, etc.) to the mesh reconstruction module 610. The depth processing module 608 may provide processed depth information from the depth camera(s) to the mesh reconstruction module 610.

Additionally, in an exemplary embodiment, the output of the mesh reconstruction module 610 may be used by several sub-processes for post processing. For example, the output of the mesh reconstruction module 610 (e.g., a 3D point cloud, a 3D mesh, and the like) may be provided to the user body tracking module 612 to aid in tracking a body of the user or another user in the scene. The output of the mesh reconstruction module 610 may be provided to a post processing module 614 to aid in tracking user motion, for example. The output of the reconstruction module 610 may be provided to post processing module 616 to update a scene graph of the physical environment (e.g., a general data structure that is composed of nodes and lines connecting the nodes that are representative of objects and relationships between those objects). The output of the reconstruction module 610 may be provided to the post processing module 618, such as a light estimation module to determine the lighting characteristics of the environment, and to update the reconstruction accordingly.

Figure 7:
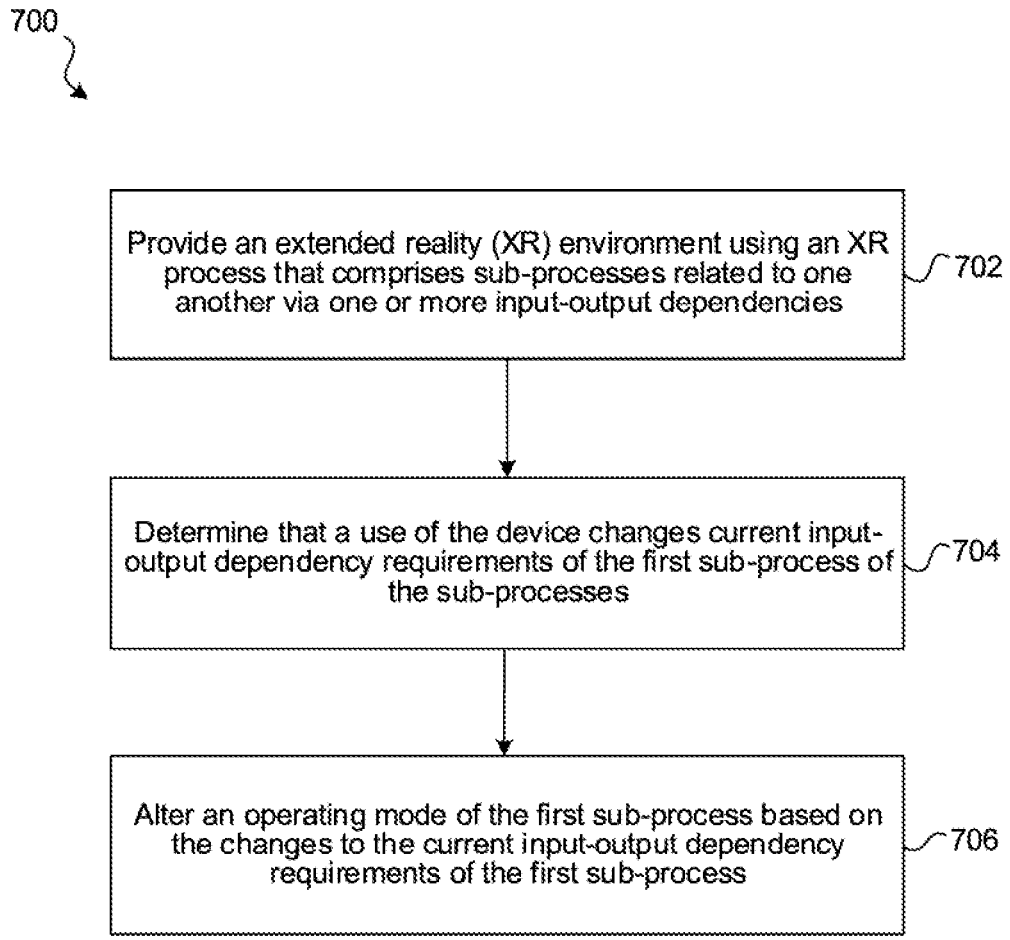
FIG. 7 is a flowchart representation of an exemplary method that alters an operating mode of a sub-process based on changes to an input-output dependency requirement in accordance with some implementations.

FIG. 7 is a flowchart representation of an exemplary method 700 that alters an operating mode of a sub-process based on changes to an input-output dependency requirement in accordance with some implementations. In some implementations, the method 700 is performed by a device (e.g., device 110 of FIG. 1), such as a mobile device, HMD, desktop, laptop, or server device. In some implementations, the method 700 is performed by processing logic, including hardware, firmware, software, or a combination thereof. In some implementations, the method 700 is performed by a processor executing one or more instruction sets stored in a non-transitory computer-readable medium (e.g., a memory).

At block 702, the method 700 provides an extended reality (XR) environment using an XR process that includes sub-processes related to one another via one or more input-output dependencies. For example, process D inputs the output of processes A and B and produces outputs used by processes C and E.

At block 704, the method 700 determines that a use of the device changes current input-output dependency requirements of the first sub-process of the sub-processes. For example, the user opens a new application, initiates a new activity, changes environments, and the like.

At block 706, the method 700 alters an operating mode of the first sub-process based on the changes to the current input-output dependency requirements of the first sub-process. In some implementations, altering the operating mode reduces or increases the resources utilized by the first sub-process to satisfy the current input-output dependencies of the first sub-process.

In some implementations, the current input-output dependency requirements of the first sub-process is based on consumer driven resource usage requirements. For example, each algorithm can have n modes and may be consumer driven and adapt based on what is needed if the user does something that changes the algorithms in use and changes the requirements for one or more algorithms. Additionally, or alternatively, in some implementations, the current input-output dependency requirements of the first sub-process is based on input driven resource usage requirements. For example, the algorithms may update their respective processing requirements based on the input frequency (e.g., if the obtained depth data is at 90 Hz, the matting coefficients may be updated at 90 Hz).

In some implementations, the first sub-process is a 3D reconstruction. The first sub-process may be based on depth information. In some implementations, the first sub-process is based on depth estimation and/or light estimation. In some implementations, the first sub-process is based on attribute information. For example, the first sub process may involve segmenting objects, materials, and/or scene information of a physical environment based on attributes of the physical environment.

In some implementations, the first sub-process produces a scene graph. In some implementations, the first sub-process produces scene information based on spatial, material, or object type information. For example, as illustrated in FIG. 6 for the mesh reconstruction module 610, several input sub-processes may produce information that is used by the mesh reconstruction module 610 (e.g., world tracking module 602, scene attribute extraction module 604, scene attribute extraction module 606, and/or metric depth module 608). Additionally, the output of the mesh reconstruction module 610 may be used by several sub-processes for post processing such as post processing modules 612, 614, 616, and 618 (e.g., a tracking module, a motion capture module, a scene graph module, an environment light estimation module, and the like).

In some implementations, one or more of the sub-processes include dependency requirements that include recursive functionality. For example, one or more of the input-output dependencies may be based on a recursive output from one or more sub-processes. For example, given a reconstruction algorithm A for T, a reconstruction algorithm can be created for all Ti recursively, by taking each tree Ti and repeatedly replacing the bottommost copies of T with single leaves labeled with the output of the algorithm A, until only the root remains.

Figure 8:
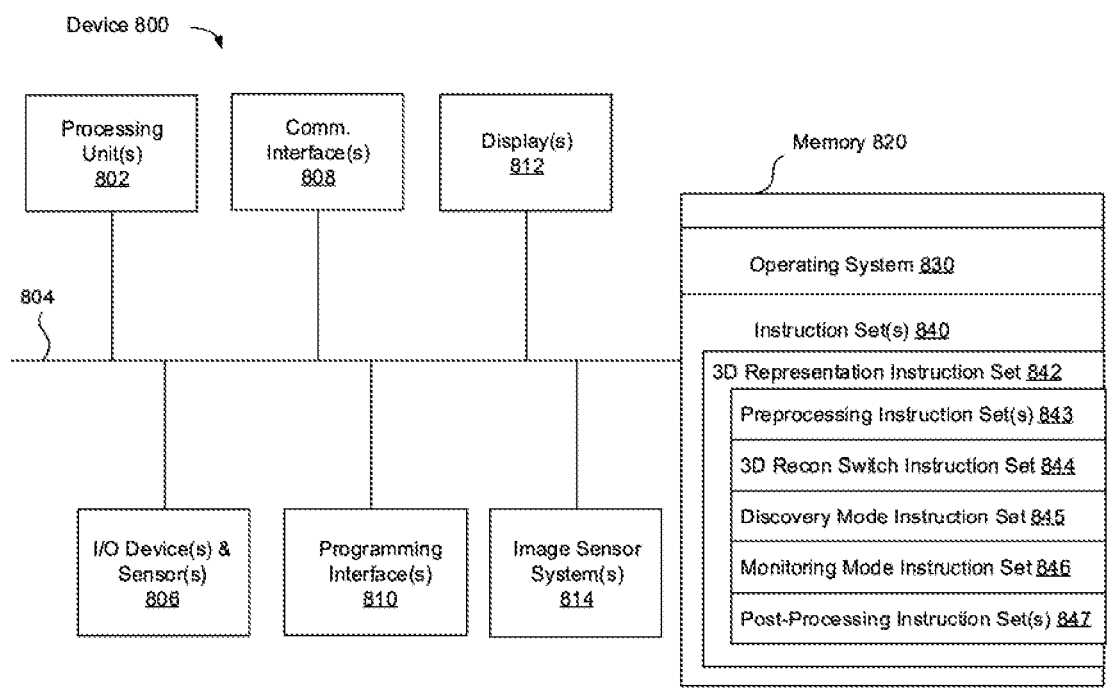
FIG. 8 is an example device in accordance with some implementations.

FIG. 8 is a block diagram of an example device 800. Device 800 illustrates an exemplary device configuration for device 110 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, 12C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 800 includes a single display. In another example, the device 800 includes a display for each eye of the user.

In some implementations, the one or more image sensor systems 814 are configured to obtain image data that corresponds to at least a portion of the physical environment 105. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 is software that is executable by the one or more processing units 802 to carry out one or more of the techniques described herein.

The instruction set(s) 840 include a 3D representation instruction set 842, a preprocessing instruction set 843, a 3D reconstruction switch instruction set 844, a discovery mode instruction set 845, a monitoring mode instruction set 846, and/or a post-processing instruction set 847. The instruction set(s) 840 may be embodied as a single software executable or multiple software executables.

The 3D representation instruction set 842 (e.g., 3D representation instruction set 320 of FIG. 3) is executable by the processing unit(s) 802 to generate 3D representation data (e.g., 3D representation data 342 or 352 of FIG. 3). For example, the 3D representation instruction set 842 obtains sensor data (e.g., sensor data 312 of a physical environment such as the physical environment 105 of FIG. 1) and generates 3D representation data (e.g., a 3D mesh representation, a 3D point cloud with associated semantic labels, or the like) using techniques described herein.

The 3D representation instruction set 842 may include the preprocessing instruction set 843 (e.g., preprocessing algorithms such as segmentation modules), a 3D reconstruction switch instruction set 844 (e.g., 3D reconstruction switch instruction set 330), a discovery mode instruction set 845

(e.g., discovery mode 3D reconstruction instruction set 340), a monitoring mode instruction set 846 (e.g., monitoring mode 3D reconstruction instruction set 350), and/or a post-processing instruction set 847 (e.g., post processing algorithms such as light estimation, body tracking, and similar post processing modules) using techniques described herein.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Returning to FIG. 1, a physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device having a processor and one or more sensors:

acquiring sensor data by the one or more sensors in a physical environment; and operating the device according to a first operating mode and a second operating mode of a plurality of operating modes during different periods of time, wherein:

in the first operating mode, the device generates a three-dimensional (3D) representation of the physical environment at a first processing rate based on the sensor data and the device monitors one or more conditions to switch to the second operating mode, and in the second operating mode, the device monitors the one or more conditions to switch to the first operating mode and generates the 3D representation at a second processing rate that is different than the first processing rate of the first operating mode.

2. The method of claim 1, wherein operating the device according to the first operating mode or the second operating mode is based on one or more parameters, wherein switching to the first operating mode or switching to the second operating mode is based on determining that the one or more parameters has changed or there is a new parameter.

3. The method of claim 2, wherein determining that the one or more parameters has changed or there is a new parameter is based on:

tracking a viewpoint or a pose of an object;
rendering a view of the 3D representation of the object from a current viewpoint/pose the object; and
comparing current sensor data with the rendered view.

4. The method of claim 3, wherein comparing current sensor data with the rendered view comprises comparing depth images.

5. The method of claim 3, wherein comparing current sensor data with the rendered view comprises determining a threshold amount of difference.

6. The method of claim 3, wherein comparing current sensor data with the rendered view is based on a distance threshold relative to the device.

7. The method of claim 1, wherein the first operating mode uses more resources than the second operating mode.

8. The method of claim 1, wherein switching to the first operating mode or switching to the second operating mode is based on system constraints.

9. The method of claim 1, wherein the first operating mode generates a 3D representation at a higher frequency than the operating mode.

10. The method of claim 1, wherein the 3D representation is not updated or updated at a lower frequency in the second operating mode than in the first operating mode.

11. The method of claim 1, wherein switching to the first operating mode or switching to the second operating mode changes one or more parameters that are propagated upstream.

12. The method of claim 1, wherein switching to the first operating mode or switching to the second operating mode changes one or more parameters that are propagated downstream.

13. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:

acquiring sensor data by one or more sensors in a physical environment; and operating the device according to a first operating mode and a second operating mode of a plurality of operating modes during different periods of time, wherein:

in the first operating mode, the device generates a three-dimensional (3D) representation of the physical environment at a first processing rate based on the sensor data and the device monitors one or more conditions to switch to the second operating mode, and in the second operating mode, the device monitors the one or more conditions to switch to the first operating mode and generates the 3D representation at a second processing rate that is different than the first processing rate of the first operating mode.

14. The device of claim 13, wherein operating the device according to the first operating mode or the second operating mode is based on one or more parameters, wherein switching to the first operating mode or switching to the second operating mode is based on determining that the one or more parameters has changed or there is a new parameter.

15. The device of claim 14, wherein determining that the one or more parameters has changed or there is a new parameter is based on:

tracking a viewpoint or a pose of an object;
rendering a view of the 3D representation of the object from a current viewpoint/pose the object; and
comparing current sensor data with the rendered view.

16. The device of claim 15, wherein comparing current sensor data with the rendered view comprises comparing depth images.

17. The device of claim 15, wherein comparing current sensor data with the rendered view comprises determining a threshold amount of difference.

18. The device of claim 15, wherein comparing current sensor data with the rendered view is based on a distance threshold relative to the device.

19. The device of claim 13, wherein the first operating mode uses more resources than the second operating mode.

20. A non-transitory computer-readable storage medium storing program instructions executable via one or more processors to perform operations comprising:

acquiring sensor data by the one or more sensors in a physical environment; and operating a device according to a first operating mode and a second operating mode of a plurality of operating modes during different periods of time, wherein:

in the first operating mode, the device generates a three-dimensional (3D) representation of the physical environment at a first processing rate based on the sensor data and the device monitors one or more conditions to switch to the second operating mode, and in the second operating mode, the device monitors the one or more conditions to switch to the first operating mode and generates the 3D representation at a second processing rate that is different than the first processing rate of the first operating mode.

* * * * *

UNITED STATES PATENT AND TRADEMARK OFFICE
CERTIFICATE OF CORRECTION

| | | |
|---|---|---|
| PATENT NO. | : 12,462,471 B2 | Page 1 of 1 |
| APPLICATION NO. | : 18/093364 | |
| DATED | : November 4, 2025 | |
| INVENTOR(S) | : Johan V. Hedberg et al. | |

It is certified that error appears in the above-identified patent and that said Letters Patent is hereby corrected as shown below:

On the Title Page

ABSTRACT, Item (57), Line 2, reads:
"...systems and methods that adjusts operating modes for..."
Should read:
--...systems and methods that adjust operating modes for...--

In the Claims

Claim 3, Column 21, Line 28, reads:
"...viewpoint/pose the object; and..."
Should read:
--...viewpoint/pose of the object; and...--

Claim 15, Column 22, Line 32, reads:
"...viewpoint/pose the object; and..."
Should read:
--...viewpoint/pose of the object; and...--

Signed and Sealed this
Ninth Day of December, 2025

John A. Squires
*Director of the United States Patent and Trademark Office*